March 2, 1943. F. C. WALTERS ET AL 2,312,456
BUTTER DISPENSER
Filed Sept. 9, 1939 2 Sheets-Sheet 1
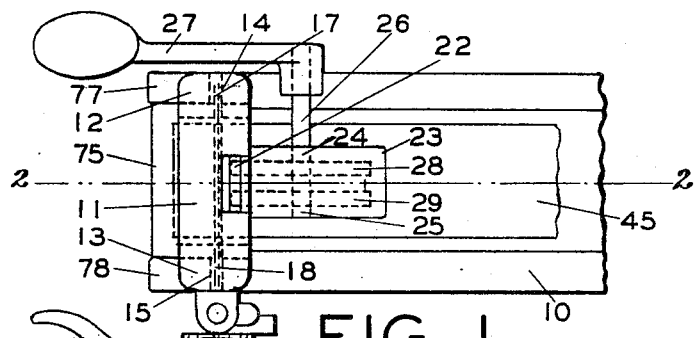
FIG. 1
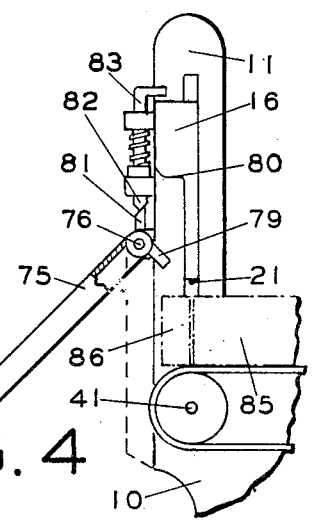
FIG. 4
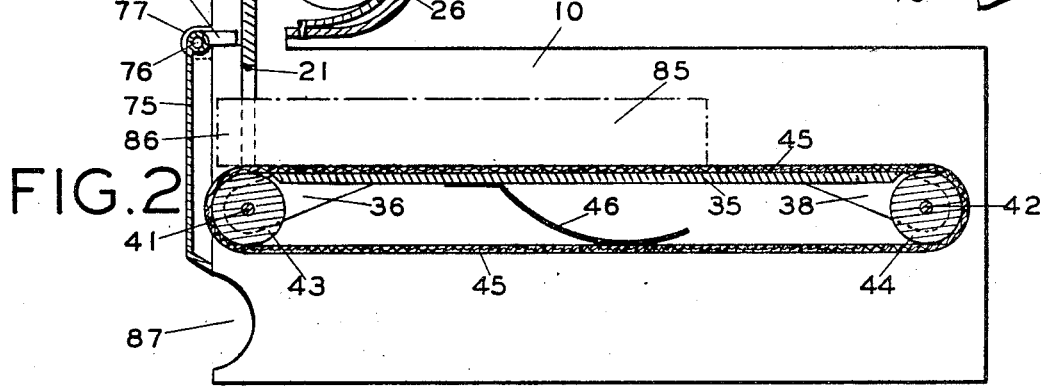
FIG. 2
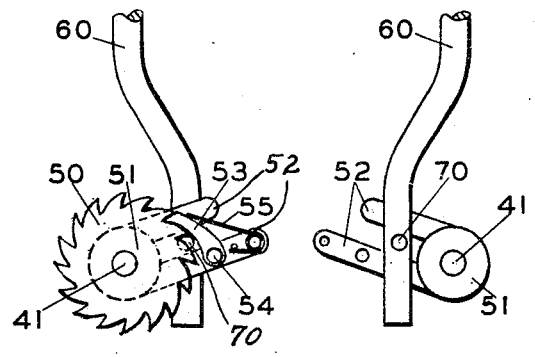
FIG. 3  FIG. 5  FIG. 6
INVENTORS
FRANKLYN C. WALTERS
CHESTER F. PROUDMAN
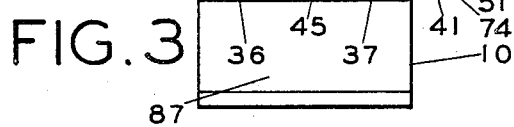
ATTORNEY March 2, 1943.　　F. C. WALTERS ET AL　　2,312,456
BUTTER DISPENSER
Filed Sept. 9, 1939　　2 Sheets-Sheet 2

INVENTORS
FRANKLYN C. WALTERS
CHESTER F. PROUDMAN
BY Mathias R. Kondolf
ATTORNEY Patented Mar. 2, 1943

2,312,456

UNITED STATES PATENT OFFICE 2,312,456

BUTTER DISPENSER

Franklyn C. Walters and Chester F. Proudman, New Canaan, Conn., assignors to The Walpro Products Corporation, New Canaan, Conn., a corporation of Connecticut Application September 9, 1939, Serial No. 294,062

6 Claims. (Cl. 31—20)

This invention relates to apparatus for use in the dispensing and individual service of butter, cheese or similar products. In particular, this apparatus is adapted for use in restaurants, at soda fountains, etc., where it is desired to serve butter in individual pieces or pats and to have same at proper temperature, uniform in thickness, unmarred and with clean cut edges.

The ordinary manner of serving butter in restaurants necessitates the cutting of the butter into pieces, which are generally not uniform in size, and the storage of these pieces prior to service. The pieces of butter adhere to one another and to the receptacle, and under certain temperatures conditions, are difficult to separate. If tongs or other device is used to place the pieces of butter on service plates, objectionable marks are often made upon the butter. Because of the necessary exposure of the prepared pieces and the second handling required, the usual procedure described is wasteful, unsanitary and a source of expense and annoyance to the restaurant.

We are aware that devices have been designed to dispense butter in individual pieces and directly onto service plates. We believe that such former devices have not proven practical because of inherent defects in the manner of supporting the bar or print of butter in the device and because of the manner in which the bar has been fed between successive cuts. Great difficulty in cleaning many of these devices would also be experienced.

In order to overcome the difficulties experienced with devices of the prior art the particular objects of our invention are as follows:

To provide a substantially horizontal conveyor to support the butter within the apparatus.

To provide a cutting wire or knife to reciprocate vertically above the conveyor for the purpose of separating the individual pieces from the parent bar.

To provide intermittent feed mechanism to actuate the conveyor during the time when the cutting wire is not in engagement with the parent bar.

To provide mechanism which may be readily adjusted or varied to dispense pieces of butter of different thicknesses.

To provide in one form of the invention a rack and gear mechanism to complete the operating cycle of the device with a relatively small angular motion of the operating handle.

To provide unitary conveyor means which may be readily removed from the device for cleaning purposes.

To provide a closure for the discharge opening of the device, which closure is automatically closed after each dispensing of butter and thereby materially assists in maintaining the cold temperature of the butter within the device.

To these and other ends the characteristic features and advantages of my improvement will more fully appear in the following description and the accompanying drawings in illustration thereof.

In the drawings, in which like reference numerals designate like parts:

Fig. 1 is a plan view of the cutting head of one form of the device, utilizing a ratchet or linear drive.

Fig. 2 is a view of a vertical section taken on the line 2—2 of Fig. 1.

Fig. 3 is a front elevation of the device of Fig. 1.

Fig. 4 is a view of a part of the apparatus showing the door and associated parts for opening the door.

Fig. 5 is an enlarged view of a portion of the device showing elements of the ratchet feed mechanism.

Fig. 6 is a reverse view of part of the mechanism of Fig. 5.

Figure 7:
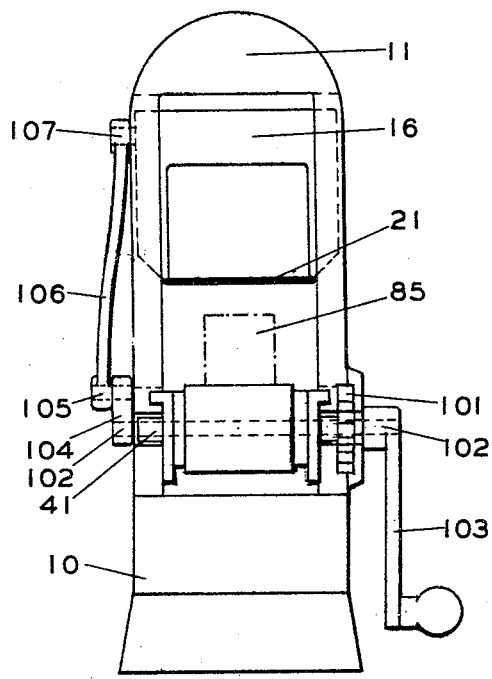
Fig. 7 is the front elevation of the device utilizing different mechanism to obtain a rotary drive for the intermittent feed of the conveyor belt.

Referring to the drawings, in which like reference numerals represent like parts, In Fig. 1, reference numeral 10 designates the frame or base of the machine and 11 is an upright standard provided with the side portions 12 and 13. The side portion 12 has a vertical guideway 14 and the side portion 13 has a vertical guideway 15. Slidably mounted within the standard 11 is the vertical reciprocating slide 16 as shown in front elevation in Fig. 3. The slide 16 is provided with slide lugs 17 and 18 which engage respectively with the vertical ways 14 and 15 and guide the slide 16 in its reciprocating motion.

The arms 19 and 20 project downward from the body of the slide 16 and form an inverted U-shape aperture. Fixed across the bottom of the arms 19 and 20 is the cutting wire 21, which may be either welded to the lower ends of the arms or otherwise held in position.

It will be understood that with some products, such as hard cheese, a knife edge would be more suitable for cutting purposes than the wire described.

As shown in Fig. 2 a rack 22 is fixed to the slide 16 and moves up and down with the slide.

Mounted on the standard 11 is the gear case 23 and concentric with the case 23 and at each side thereof are provided the bearings 24 and 25 for the transverse operating shaft 26. The shaft 26 is rotated by means of the handle 27. Fixed to the shaft 26 are the gears 28 and 29 which mesh with the rack 22.

From the structure described it will be noted that motion of the handle 27 will rotate the shaft 26, the gears 28 and 29 and thereby move the rack 22 and the slide 16. A spiral spring 30 has its inner end attached to the shaft 26 and its outer end attached to the casing 23 as shown in Fig. 2 and a counterclockwise motion of the shaft 26 will wind the spring. The spring 30 is of such strength as to cause the return of the slide 16 to its upper position upon removal of downward pressure on the handle 27.

A conveyor plate or support 35 is provided with a pair of depending front ears 36 and 37 (see Figs. 2 and 3) and a pair of depending rear ears, one of which is shown at 38 in Fig. 2. Side flanges 39 and 40 extend laterally from the support 35. Journalled transversely of each pair of ears are the conveyor shafts 41 and 42. The conveyor shaft 41 has fixed thereon the front pulley 43 and the conveyor shaft 42 has fixed thereon the rear pulley 44. Extending around the pulleys 43 and 44 and over the top of the conveyor support 35 is the conveyor belt 45, which may be of fabric material, or of any flexible material such as thin metal, rubber or Celluloid which is suitable for the purpose. A spring pressure plate 46 may be attached to the support 35 and maintain pressure on the lower run of the belt 45 to secure proper belt traction.

Fixed to the front shaft 41 is the ratchet wheel 50 and rotatably mounted on the shaft 41 is the collar 51 carrying the split arm 52, as shown in Figs. 5 and 6. A pawl 53 is attached to the arm 52 by a stud 54 and is kept in engagement with the ratchet wheel 50 by means of the pawl spring 55. From this construction it will be noted that oscillating motion of the arm 52 and the pawl 53 will cause the ratchet wheel 50 to revolve.

The rod 60 slides in the bearings 61 and 62 which in turn are mounted on the standard 11. A fixed collar 63 is attached to the rod 60 and a compression spring 64 between the bearing 62 and the collar 63 tends normally to hold the rod 60 in its lowest position. A collar 65 may be adjusted and fixed to the rod 60 at the proper position by means of the set screw 66. The lug 67 is fixed to the slide 16 and moves up and down with the slide. Near the upper end of the stroke of the slide 16, the lug 67 engages the bottom of the collar 65 and for the remainder of the upward stroke of the slide 16 the rod 60 is moved upwardly with the slide. From this construction it will be noted that adjustment of the collar 65 up or down the rod 60 will change the length of stroke of the rod 60.

A pin 70 is fixed transversely of the rod 60 and engages with the split arm 51. Linear motion of the rod 60 is thus converted into rotary motion of the collar 51 and the ratchet wheel 50. As described above, adjustment of the collar 65 on the rod 60 will vary the length of stroke of the rod 60 and thereby cause the pawl 53 to operate over a variable number of teeth in the ratchet wheel 50. This in turn will change the amount of angular rotation of the shaft 41 and pulley 43 and vary the amount of travel or feed of the belt 45.

The side flanges 39 and 40 of the conveyor support 35 are adapted to slide within horizontal grooves or ways 71 and 72 in the frame 10. Slots are provided in the frame 10 as shown at 73 and 74 to accommodate the shaft 41 and its bearings. From this construction it will be noted that the conveyor assembly may be withdrawn as a unit from the frame 10, the pin 70 sliding out of the split arm 52 when the conveyor assembly is withdrawn. In replacing the unit, the pin 70 is again engaged with the slot in the split arm 52. This feature enables the conveyor assembly to be readily removed from the device for cleaning or sterilizing.

As shown in Figs. 1, 2 and 4 a door or closure 75 is attached to the front of the standard 11 by the shaft 76, which rotates in the bearings 77 and 78. As shown in Fig. 2 an operating arm 79 is fixed in angular relation to the door, and the slide 16 is recessed and provided with the striking block 80. When the slide 16 is lowered the block 80 engages the arm 79 and opens the door 75. As will be explained hereinafter in connection with the operation of the device, the piece of butter which is cut from the parent bar will generally fall forward immediately upon severance. In the construction shown in Fig. 2, when the cutting wire is at its lowest point or in contact with the conveyor belt 45, the door 75 is held open at an appropriate angle so as not to interfere with the discharge path of the piece of butter.

Under certain conditions the piece of butter cut from the parent bar may not immediately fall upon severance and such delay may persist until the conveyor belt has been fed forward for the next cut. As described above, the feed of the belt is brought about through upward motion of the rod 60 and this motion is not commenced until the slide 16 is near the upper end of its stroke. In the construction shown in Fig. 2, the door 75 would have dropped into closed position before the feed of the belt takes place and in the case of delayed discharge of butter as described, the door 75 would obstruct the path of the butter being dispensed. While the door is made of light material and normally would swing out of the way upon contact with the butter, a different mechanism may be used, if preferred, for controlling the door as shown in Fig. 4.

As shown in Fig. 4, the door 75 is provided with the actuating arm 79 and also with a trigger arm 81 which is in fixed angular relation to the door 75. When the slide 16 moves downwardly, the block 80 contacts the arm 79 and raises the door 75 into open position. This same movement causes the trigger arm 81 to be engaged under the spring latch or trigger 82. Upon upward movement of the slide 16 the door is held in open position by the trigger arm and the latch 82, and remains open until the upper end of the slide engages the latch bolt 83 and moves same upwardly to release the trigger arm 81 and the door 75, which then falls into closed position, as shown by the broken lines in Fig. 4.

In operation, a bar or print of butter 85 is placed within the device upon the top of the conveyor belt 45, and several strokes of the handle 27 will bring the front end of the bar within range of the cutting head. The handle 27 is now pressed downwardly and, as described above, the cutting wire 21 severs a piece of butter 86 from the front end of the parent bar. As shown in Fig. 4, the cutting preferably takes place in a vertical transverse plane through the center of the front pulley. As soon as the piece 86 is cut free from the parent bar 85 it will fall forward and be discharged from the device in practically every case.

Upon removal of pressure from the handle 27, the spring 30 will cause the return of the cutting wire to its upper position above the top of the bar of butter 85. As described above, the return of the slide 16 operates the rod 60 and the ratchet wheel 50 to rotate the conveyor pulley 43 and move the conveyor belt forward the desired amount to obtain the requisite thickness in the next piece of butter to be cut from the bar 85.

A cut out portion 87 is provided in front of the frame 10 to permit a dish to be placed under the end of the conveyor belt and thus cause the piece of butter dispensed from the machine to fall upon the dish.

It will be noted that the cutting head in the device shown in Figs. 1 to 6 inclusive, operates with a curvilinear motion of the handle, and one of the features of this construction is the comparatively small angular motion of the handle required to operate the device.

Figure 8:
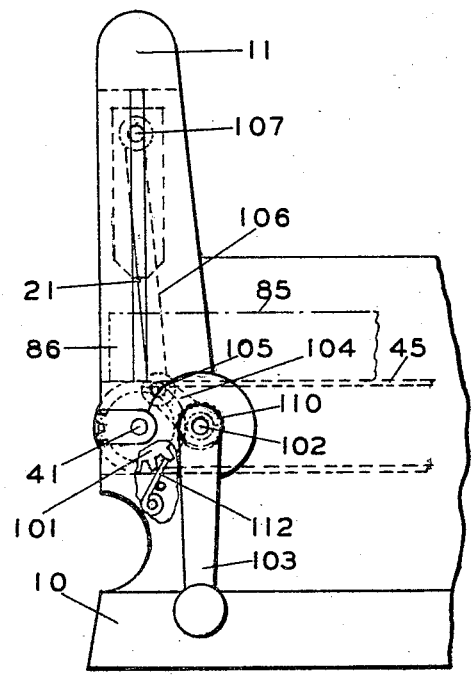
Fig. 8 is a side elevation of the device of Fig. 7.
Figure 9:
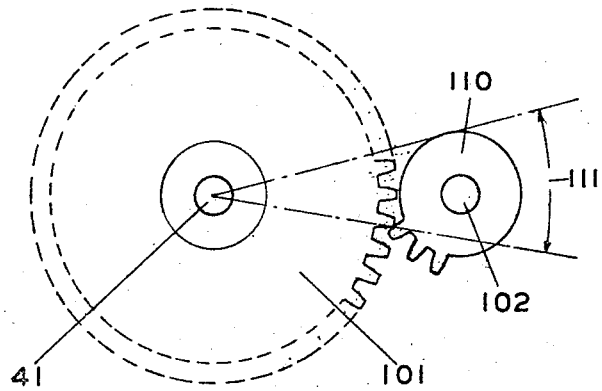
Fig. 9 is a detail to a larger scale showing the gear drive of the device shown in Fig. 7.

In the modification shown in Figs. 7, 8 and 9 a rotary motion of the operating handle is utilized.

Referring to Figs. 7, 8 and 9 the structure shown consists essentially of the same parts as described above and comprises the frame 10, standard 11, slide 16, cutting wire 21 and the conveyor belt 45 and conveyor pulleys and shafts. The mechanical operation of the parts, however, is somewhat different as will now be described.

Referring to Figs. 7, 8 and 9, the front conveyor shaft 41 has fixed thereon a gear wheel 101. Mounted parallel to the conveyor shaft 41 is an additional operating shaft 102 which carries the operating handle 103. Fixed on the shaft 102 is a crank arm 104 which in turn engages through a crank pin 105 with the connecting rod 106. This rod in turn engages the wrist pin 107 which is fixed to the slide 16.

One complete revolution of the handle 103 will cause the slide 16 to move downwardly and up again to its initial position and during this movement of the slide, the cutting wire 21 will sever the piece of butter from the parent bar 85.

Mounted on the shaft 102 is the fractional pinion 110 which engages and rotates the gear 101 during a part of each revolution of the shaft 102. As shown in Fig. 9, if the pinion 110 is provided with three teeth, the gear 101 will be rotated through the angle shown by the arc 111. Pinions having 1, 2, 3 or more teeth may be provided to change the angular movement of the shaft 41, and consequently the amount of feed of the conveyor belt will vary accordingly.

To provide for a fixed position of the teeth of the gear 101 and smooth operation of the intermittent drive, a flat spring or equivalent device as shown at 112 is mounted on the frame 10 and holds the gear 101 during the time the teeth on the pinion 110 are not in mesh with the teeth on the gear 101. This spring 112 may be placed at an angle, approximately as shown in Fig. 8, to prevent reverse rotation of the gear 101 and thus make it necessary to revolve the handle 103 in the proper direction to secure operation of the device.

A feature of the invention is the cutting of the butter substantially in a vertical plane passing through the axis of the pulley at the discharge end of the conveyor. This cutting position provides a firm anvil or unyielding support on which the parent bar rests during the cutting operation and causes the piece of butter being cut off to project and be separated from the conveyor belt. The automatic separation of the end of the parent bar from the conveyor prior to cutting off is particularly important because of the adherent nature of butter under certain conditions.

We claim:

1. A butter dispenser comprising a horizontal conveyor; cutting means above said conveyor and a closure for the discharge end of said conveyor comprising a door mounted to swing from closed to open position; an operating arm to open said door; a spring latch to hold said door in open position; and a trigger release for said latch to close said door in timed relation to said cutting means.

2. A butter dispenser comprising in combination a frame; a conveyor plate positioned in said frame; front and rear conveyor pulleys mounted on said plate; a conveyor belt over said pulleys and on said plate, to provide the sole support for a parent bar of butter, the forward end of said bar being projected from said belt at time of cutting; a ratchet wheel fixed to one conveyor pulley; a standard mounted on said frame approximately perpendicular to said conveyor belt; a slide in said standard; a cutting wire fixed to said slide crosswise of said belt, said cutting wire being mounted to reciprocate in the vertical plane through the axis of said front conveyor pulley to cut said parent bar against a firm anvil, at the line where said projection begins; a rack fixed to said slide; a gear in mesh with said rack; a shaft rotatably mounted on said standard and with said gear fixed thereon; a spiral spring tensioned by rotation of said shaft; a handle to rotate said shaft; a pawl engaging said ratchet wheel; a rod in operative relation to said pawl; a movable collar on said rod and a lug on said slide to engage said collar and operate said rod upon reciprocation of said slide.

3. A butter dispenser comprising in combination a frame; a conveyor plate removably positioned in said frame; front and rear conveyor pulleys mounted on said plate; a conveyor belt over said pulleys and on said plate to provide the sole support for a parent bar of butter, the forward end of said bar being projected from said belt at time of cutting; a gear fixed to one conveyor pulley; a standard mounted on said frame approximately perpendicular to said conveyor belt; a slide adapted to reciprocate in said standard; a cutting wire fixed to said slide crosswise of said belt, said cutting wire being mounted to reciprocate in the vertical plane through the axis of said front conveyor pulley to cut said parent bar against a firm anvil, at the line where said projection begins; a shaft parallel to said pulleys; an operating handle fixed to said shaft; a fractional pinion mounted on said shaft to give intermittent timed motion to said gear; a crank arm fixed to said shaft and a connecting rod between said crank arm and said slide to reciprocate said slide upon rotation of said shaft.

4. A butter dispenser comprising a horizontal conveyor, including a front pulley, to provide the sole support for a parent bar of butter, the forward end of said bar being projected from said conveyor at the time of cutting and a cutting wire mounted to reciprocate above said conveyor in the vertical plane through the axis of said front pulley, to cut said parent bar against a firm anvil at the line where said projection begins.

5. A butter dispenser comprising a horizontal conveyor, including a front pulley, to provide the sole support for a parent bar of butter, the forward end of said bar being projected from said conveyor at the time of cutting; a cutting wire mounted to reciprocate above said conveyor in the vertical plane through the axis of said front pulley, to cut said parent bar against a firm anvil at the line where said projection begins and means to intermittently move said conveyor in timed relation to the movement of said cutting wire.

6. A butter dispenser comprising a horizontal conveyor, including a front pulley, to provide the sole support for a parent bar of butter, the forward end of said bar being projected from said conveyor at the time of cutting; a cutting wire mounted to reciprocate above said conveyor in the vertical plane through the axis of said front pulley, to cut said parent bar against a firm anvil at the line where said projection begins and ratchet means to intermittently move said conveyor in timed relation to the movement of said cutting wire.

FRANKLYN C. WALTERS.
CHESTER F. PROUDMAN.